United States Patent [19]

Drew et al.

[11] Patent Number: 5,100,712
[45] Date of Patent: Mar. 31, 1992

[54] FLOWABLE, PRESSURE-COMPENSATING MATERIAL AND PROCESS FOR PRODUCING SAME

[75] Inventors: Terrence M. Drew; Chris A. Hanson; Alden B. Hanson, all of Boulder, Colo.

[73] Assignee: Alden Laboratories, Inc., Boulder, Colo.

[21] Appl. No.: 410,610

[22] Filed: Sep. 21, 1989

[51] Int. Cl.$^5$ .................. B32B 1/00; C09K 21/00; A61L 2/00
[52] U.S. Cl. ................................ 428/68; 106/672; 252/601; 422/1; 428/76; 428/907; 428/921
[58] Field of Search ............... 428/68, 76, 907, 921; 106/672; 252/601; 422/1

[56] References Cited

U.S. PATENT DOCUMENTS

| | | | |
|---|---|---|---|
| 3,308,491 | 3/1967 | Spence | 5/450 |
| 3,402,411 | 9/1968 | Hanson | 12/142 |
| 3,449,844 | 6/1969 | Spence | 36/44 |
| 3,548,420 | 12/1970 | Spence | 623/37 |
| 3,635,849 | 1/1972 | Hanson | 128/595 |
| 3,663,973 | 5/1972 | Spence | 5/450 |
| 3,810,265 | 5/1974 | McGrew | 5/450 |
| 4,019,209 | 4/1977 | Spence | 623/7 |
| 4,038,762 | 8/1977 | Swan, Jr. | 36/89 |
| 4,083,127 | 4/1978 | Hanson | 36/93 |
| 4,108,928 | 8/1978 | Swan, Jr. | 264/26 |
| 4,144,658 | 3/1979 | Swan, Jr. | 36/117 |
| 4,229,546 | 10/1980 | Swan, Jr. | 521/55 |
| 4,243,754 | 1/1981 | Swan, Jr. | 521/55 |
| 4,380,569 | 4/1983 | Shaw | 428/283 |
| 4,668,564 | 5/1987 | Orchard | 428/246 |

OTHER PUBLICATIONS

"Aqualon (TM) Cellulose Gum, Sodium Carboxylmethylcellulose, Physical and Chemical Properties", copyright 1988, Aqualon Company.
"Natrosol; (TM), Hydroxyethylcellulose, A Non-Ionic Water Soluble Polymer, Physical and Chemical Properties", revised Jul. 1987, Aqualon Company.

Primary Examiner—William J. Van Balen
Attorney, Agent, or Firm—Sheridan, Ross & McIntosh

[57] ABSTRACT

A flowable, pressure-compensating composition is provided comprising a liquid, a material for increasing the viscosity of the liquid and spherical particles. A method for making such composition is also provided. The composition is especially suitable for use in padding devices.

38 Claims, No Drawings

FLOWABLE, PRESSURE-COMPENSATING MATERIAL AND PROCESS FOR PRODUCING SAME

FIELD OF THE INVENTION

This invention relates generally to the field of padding materials, and in particular, to flowable, pressure-compensating materials and methods for producing such materials.

BACKGROUND OF THE INVENTION

Various padding devices have been employed in the past. Examples include liquid- or gas-filled bladders, e.g. water-filled cushions and pneumatic pads; and gases or liquids dispersed in a solid material, e.g. foams and gels Generally, such padding devices operate on the placed under pressure. When a force, such as a person's mass, is placed on such a padding device, the device deforms so as to conform to the shape of the pressure applying object in order to distribute the force over as large an area as possible. These devices perform adequately when the object being padded has a relatively large, uniformly shaped surface area. However, when the object being padded includes a relatively small area of concentrated force, such as that caused by a protuberance, the majority of known padding devices do not perform to adequately reduce the discomfort of users in many applications. This is because such padding devices exert greater responsive pressure on the area of concentrated force.

The reason for the greater pressure is that materials employed in prior art padding devices typically have a high degree of "memory." As used herein, the term "memory" will refer to that characteristic of a material in which the material returns to its original shape as a result of internal restoring forces when an external force is removed. Such materials deform to the shape of an object which applies an external force by compressing. However, due to the internal restoring forces, a pressure which is proportional to the degree of compression is exerted against the object which applies the external force. A sharp protuberance compresses the padding device more than the surrounding areas and, as a result, the padding device presses back with greater pressure in these areas of high compression. Such areas of high pressure are especially undesirable when the protuberance is a bone, such as an ankle or ischial tuberosity. The high pressure can lead to discomfort and, after periods of extended use, to actual damage to the tissue overlying the protruding bone.

The problem can be described with reference to a padding device comprising a gas dispersed in a solid material, e.g. foam. Tiny gas bubbles in foam act like millions of coil "springs." When required to conform to an irregular shape, such as a human body, the "springs" are compressed to varying degrees, each pushing back on the body with a force proportional to the amount of compression. Intimate conformity is best obtained with a relatively soft foam, which can be compared to weak "springs." The pressure on protuberances, where the "springs" are greatly compressed, will be relatively high, possibly causing pain and reduced circulation. The problem is even more pronounced if a stiffer foam is employed, because the "springs" are stronger.

Deformable silicone gel padding devices are disclosed in U.S. Pat. No. 3,449,844 by Spence, issued June 17, 1969; U.S. Pat. No. 4,380,569 by Shaw, issued Apr. 19, 1983; U.S. Pat. No. 3,663,973 by Spence, issued May 23, 1972; U.S. Pat. No. 3,548,420 by Spence, issued Dec. 22, 1970; U.S. Pat. No. 3,308,491 by Spence, issued Mar. 14, 1967; U.S. Pat. No. 4,019,209 by Spence issued Apr. 26, 1977; and U.S. Pat. No. 4,668,564 by Orchard, issued May 26, 1987. In U.S. Pat. No. 4,380,569, a silicone gel containing glass microbeads is disclosed.

The silicone gel disclosed in these patents is described as having near total memory. In other words, it returns to its original shape when an external force is removed. The internal restoring forces necessary to provide such memory are undesirable in some applications. In use, differential pressures will result depending upon the degree of deformation of the silicone gel material, with higher deformation resulting in localized areas of high pressure being exerted on the external pressure applying object.

In order to alleviate the problem of differential pressure inherent with many prior art materials, flowable, pressure-compensating materials were developed. Such materials and applications thereof are described in U.S. Pat. No. 3,402,411 by Alden Hanson, issued Sept. 24, 1968; U.S. Pat. No. 3,635,849 by Alden Hanson, issued Jan. 18, 1972; U.S. Pat. No. 4,038,762 by Swan, Jr., issued Aug. 2, 1977; U.S. Pat. No. 4,083,127 by Chris Hanson, issued Apr. 11, 1978; U.S. Pat. No. 4,108,928 by Swan, Jr., issued Aug. 22, 1978; U.S. Pat. No. 4,144,658 by Swan, Jr., issued Mar. 20, 1979; U.S. Pat. No. 4,229,546 by Swan, Jr., issued Oct. 21, 1980; and U.S. Pat. No. 4,243,754 by Swan, Jr., issued Jan. 6, 1981. Each of these U.S. patents is incorporated herein by reference in its entirety. These patents will collectively be referred to as the "flowable, pressure-compensating material patents."

The preferred materials disclosed in U.S. Pat. No. 3,402,411 comprise 20%–25% by weight polyisobutylene, 25%–37.5% by weight of an inert oil, e.g. mineral oil or a saturated ester oil or a mixture thereof and 42.5%–50% by weight inorganic filler. U.S. Pat. No. 3,635,849 discloses a composition consisting essentially of from about 5 to about 45% of a polyolefin, particularly polyisobutylene, from about 15 to about 70% of a paraffin and from about 5 to about 80% oil. Lightweight aggregate materials, for example, polystyrene beads or a heavy aggregate such as $Fe_3O_4$ can also be added.

The flowable, pressure-compensating materials disclosed in U.S. Pat. Nos. 4,038,762, 4,108,928 and 4,243,754 include from 21.39 to 77.96 weight percent oil, 21.04 to 69.62 weight percent wax and 1 to 9 weight percent microbeads. These patents teach away from the use of water in the finished product stating that "Since water generally increases the specific gravity of the finished fitting material, and does not serve any functional or necessary purpose, as such, in the finished fitting material, it is very desirable that if it is present in the finished fitting material, that it not be present in amounts or levels that exceed tolerable, minimal or residual levels (e.g. up to or not exceeding about 8% by weight, preferably up to not exceeding about 3% or about 5% by weight)."

U.S. Pat. Nos. 4,144,658 and 4,229,546 disclose flowable, pressure-compensating materials comprising 10 to 60 weight percent hollow, glass microbeads, 8.5 to 34% wax and 26.5 to 81% oil. U.S. Pat. No. 4,083,127 discloses a flowable, pressure-compensating fitting material consisting essentially of discrete, lightweight, sturdy microbeads distributed throughout a continuous phase of wax and oil.

In use, the flowable, pressure-compensating materials disclosed in the above-mentioned patents are typically placed in a pliable package, such as between two leak-proof resinous sheets which are sealed at the edges. The flowable materials act hydraulically. An applied force causes flowable material to migrate from areas of higher pressure to areas of lower pressure until pressure throughout the package is uniform. Once conformity has been achieved, force is distributed substantially equally over the entire surface of the package thus alleviating the differential pressure problems associated with prior devices. The viscosity of the flowable materials can be varied. Higher viscosity does not decrease the ability of the flowable materials to conform to the shape of the pressure applying object, only the rate at which they will migrate to conform. Flowable materials are presently marketed under the trademark FLOLITE TM by Alden Laboratories, Inc. of Boulder, Colorado U.S.A.

FLOLITE TM brand materials have performed exceptionally well in a number of applications, and have gained commercial acceptance in the marketplace. In spite of this commercial success, it would be advantageous to provide novel compositions which are useful as flowable, pressure-compensating materials. For example, it would be advantageous to provide a composition which exhibits a higher degree of flame retardancy than present flowable, pressure-compensating materials. It would be advantageous if the number of components required to provide a flowable, pressure-compensating composition were reduced to a minimum. In this way, it would be possible to simplify manufacturing. It would be advantageous if the materials used in a composition were relatively inexpensive in order to reduce raw material costs. It would be advantageous if the composition were to be less prone to separation than currently-employed materials. It would be advantageous if spherical particles included in a flowable, pressure-compensating composition would not "float out" of the composition. It would be advantageous if the viscosity of the composition was relatively stable over broad temperature ranges. It would be advantageous if the viscosity of the material could be controlled in such a way so as to ease manufacture of devices containing the composition.

SUMMARY OF THE INVENTION

In accordance with the present invention, a novel flowable, pressure-compensating composition is provided. The composition comprises a liquid, preferably water, a material for increasing the viscosity of the liquid and substantially spherical particles dispersed throughout the composition.

Preferably, the material for increasing the viscosity of the liquid is selected from the group consisting of carboxymethylcellulose, hydroxypropylcellulose, hydroxyethylcellulose, polyethyleneoxide and mixtures thereof. Preferably, the spherical particles are less than about 300 micrometers in diameter. In an additional preferred embodiment, an antifreeze such as glycerin is added to the composition. Glycerin has the advantage of not only lowering the freezing point of the composition, but it also provides a "viscosity bonus effect" which is described in more detail hereinbelow.

The present compositions provide a number of advantages. When water is used in the composition, it typically has a higher degree of flame retardancy than prior art materials which are oil and/or wax based. Additionally, because water is a relatively inexpensive starting material, the total cost of the composition can be reduced. Further, the spherical particles dispersed throughout the composition are not prone to float to the top of the composition (a condition termed "float out"), in spite of being less dense than the remainder of the composition. Also, the viscosities of the present compositions are stable over broad temperature ranges. Furthermore, the present compositions can have initially low viscosities for limited periods of time to ease workability. This is advantageous when manufacturing padding devices because it allows the compositions to be poured into an enclosure which is then sealed. Subsequently, the viscosity of the composition increases to the desired level. Additionally, the present composition can be employed in polyvinylchloride packages, which are less expensive than the polyurethane packages that were previously employed to contain oil and wax materials.

A process for producing the flowable, pressure-compensating compositions is also provided. The process includes the steps of selecting a type and amount of viscosity-increasing agent, selecting a type and amount of liquid having an affinity for the agent and selecting a size, type and amount of substantially spherical particles. The viscosity-increasing agent, the liquid and the spherical particles are mixed together until the viscosity-increasing agent and the particles are distributed substantially evenly throughout the liquid.

Preferably, the flowable, pressure-compensating composition of the present invention is placed within an enclosure. In a preferred embodiment, the composition is placed between two resinous sheets, which are subsequently heat sealed together. Preferably, the composition is treated to kill microorganisms and prevent their growth.

DETAILED DESCRIPTION OF THE INVENTION

In accordance with the present invention, a flowable, pressure-compensating composition and process for making the same is provided.

The composition includes a liquid, preferably water, and a viscosity-increasing agent which has an affinity for the liquid. Spherical particles are dispersed throughout the composition. Preferably, a freeze-point lowering agent is also included in the present composition. Additionally, preservatives may be included to prevent microbiological attack and chemical degradation.

The process for producing the present composition includes mixing the fluid, viscosity-increasing agent and spherical particles until a homogenous mixture is achieved. The pH of the composition can be adjusted in order to control the rate in which the viscosity of the fluid increases, i.e. the "viscosity buildup" rate. Generally, if the pH is lowered, the viscosity buildup will proceed at a slower rate. A low pH is also advantageous when using various preservatives.

Water is the preferred liquid for use in the present composition. However, other liquids, e.g. alcohols such as glycerine, can also be employed. An important advantage gained from the use of water is that it increases the flame retardancy of the composition. The liquid can be present in an amount in the range of from about 20% by weight to about 75% by weight based on the total composition weight, and is preferably present in an amount from about 50% to about 60% by weight.

The viscosity-increasing agent is a material which, when mixed with the liquid, increases the viscosity of the liquid. Preferred viscosity-increasing agents for use with water are gums, cellulose-based materials and other polymers. Preferred viscosity-increasing agents include guar, agar, hydroxyethylcellulose, carboxymethylcellulose, hydroxypropylcellulose and polyethyleneoxide.

Hydroxyethylcellulose, carboxymethylcellulose and hydroxypropylcellulose, as well as other cellulose-based materials, are available from Aqualon Company of Wilmington, Delaware. Carboxymethylcellulose is described in a report entitled "Aqualon (TM) Cellulose Gum, Sodium Carboxylmethylcellulose, Physical and Chemical Properties" copyright 1988, available from Aqualon Company. Hydroxyethylcellulose is described in a report entitled "Natrosol (TM), Hydroxyethylcellulose, A Non-Ionic Water-Soluble Polymer, Physical and Chemical Properties," revised July 1987, available from Aqualon Company. Both of these Aqualon publications are incorporated herein by reference in their entirety.

The viscosity-increasing agents are preferably present in an amount from about 0.5 weight percent to about 10 weight percent, based on the total composition weight. More preferably the agent comprises less than 6 weight percent and most preferably from about 2 to about 4 weight percent of the total composition weight. The viscosity-increasing agents of the present invention have the important characteristic of increasing the viscosity of a fluid, while still permitting the fluid to flow.

The typical composition of the present invention is flowable and does not have total memory. In other words, once deformed, it will not always return to its original shape. However, some compositions in accordance with the present invention exhibit some gel strength. But the gel structure can be broken merely by applying sufficient force.

The compositions of the present invention are non-Newtonian, because their viscosities change when the shear rate changes. In other words, the ratio of shear rate (flow) to shear stress (force) is not constant. The compositions are typically either pseudoplastic or thixotropic. A pseudoplastic composition is one which appears to have a yield stress beyond which flow commences and increases sharply with increase in stress. In practice, the compositions exhibit flow at all shear stresses, although the ratio of flow to force increases negligibly until the force exceeds the apparent yield stress. The flow rate of a thixotropic substance increases with increasing duration of agitation as well as with increased shear stress. In other words, the flow rate is time dependent. When agitation is stopped, internal shear stress exhibits hysteresis. Upon reagitation, generally less force is required to create a given flow than is required for the first agitation. The fact that the present materials flow more readily when higher shear stress is applied is advantageous in a number of applications.

The particles employed in the present invention are preferably spherical and hollow to lessen their density and lighten the overall weight of the flowable, pressure-compensating composition, or, if desired, can be solid or cellular. Expandable microbeads, as described in U.S. Pat. Nos. 4,243,754, 4,108,928, and 4,038,762 can also be employed.

The spherical particles may be made from a number of suitable materials including for example silica glass, saran polymer, phenolic resin and carbon. Detailed descriptions of suitable spherical particles can be found in the flowable, pressure-compensating material patents, described hereinabove and incorporated herein by reference in their entirety. Glass beads are preferred in certain applications because of their relatively low cost. When higher bead strength is desired, phenolic resin or carbon beads are preferred.

When used in compositions where a low total weight is desired, the spherical particles are preferably within the size range of from about 10 micrometers to about 300 micrometers in diameter. The density of spherical particles can be, for example, about 0.05 to about 0.70 grams per cubic centimeter. More particularly, glass spherical particles preferably have a density of from about 0.23 grams per cubic centimeter to about 0.37 grams per cubic centimeter and phenolic resin spherical particles preferably have a density of about 0.15 grams per cubic centimeter.

Specific examples of suitable spherical particles include "3M Glass Bubbles" available from 3M, St. Paul, Minnesota, and "Microballoons" available from Union Carbide Specialty Chemicals Division, Danbury, Connecticut.

The spherical particles are preferably present in an amount from about 0.01 to about 32 weight percent based on the total composition weight, and more preferably in an amount from about 20 to about 31 weight percent and still more preferably in amount from about 28 weight percent to about 30 weight percent.

The spherical particles of the present composition perform at least two important functions. First, the size, shape and quantity of the spherical particles influence the flow characteristics of the composition. Therefore, a composition can be tailored to have the desired flow characteristics by selecting the appropriate size, shape and amount of particles. Second, because of particle-to-particle contact, the spherical particles enhance the distribution of loads placed on flexible packages containing the present composition.

Another advantage of the spherical particles employed in the present invention is that they permit a degree of weight control. For example, in most applications, the composition should weigh as little as possible. In such instances, lightweight hollow particles are preferred, in order to lower the overall density of the composition. However, in some applications a heavier composition is desired. Examples of such applications would include weight belts to be strapped around parts of a person's body (e.g., wrist and ankle weights) and padding devices where it is desired that the device's own weight hold it firmly in place. When heavy compositions are desired, solid particles comprising dense materials are preferred. In such applications, particles greater than 300 micrometers in diameter can be used effectively.

When employed in padding devices, the flowable, pressure-compensating composition is generally enclosed within a flexible, protective enclosure with a predetermined volume of the composition retained therein. Preferably, the enclosure is formed of suitable flexible material and desirably is a pliable, thermoplastic, resinous film that can be heat-sealed after the composition is inserted therewithin. Because of their relatively low cost and desirable strength and flexibility characteristics, polyvinylchloride materials are preferred for use as the enclosure film.

The composition is initially distributed substantially uniformly throughout the confines of the enclosure, which is provided by sealing (e.g., heat sealing) the film along the marginal edges. If desired, one can choose to heat seal the protective enclosure for the composition, but leave a small vent opening and a small filling port, so that a predetermined volume of the flowable composition may be injected into the enclosure through the filling port, followed by heat sealing both the vent opening and the filling port. Alternatively, the composition may be placed on one sheet, a second sheet may be placed over the composition, and the outer edges sealed. As can be appreciated, internal sealing lines can also be formed to compartmentalize the composition within the enclosure.

The desired final viscosity of the composition can be selected to suit a wide variety of applications. Some applications require high viscosity compositions and others require compositions of much lower viscosity. For use in padding devices, viscosities in the range of from about 30,000 centipoise to about 1,000,000 centipoise are preferred. When the viscosity exceeds 1,000,000 centipoise, the composition is often so viscous that separation and non-homogeneity result.

The viscosity of the present compositions is generally provided by hydrogen bonding between water and the viscosity-increasing agents. This hydrogen bonding is sufficient to keep the spherical particles dispersed throughout the composition. In prior art materials, such as a silicone gel disclosed in U.S. Pat. No. 4,380,569, cross-linking reactions were believed necessary to prevent the microbeads from floating out.

In a preferred embodiment of the present invention, steps are taken in order to prevent microbiological attack and chemical degradation of the present compositions. For example, radiation sterilization can be performed. Preferably, the composition is subjected to radiation such as x-ray radiation or gamma radiation in order to destroy microorganisms present in the composition. An advantage of radiation treatment is that it can be performed after the composition has been placed in a package, such as between pliable sheets of resinous material.

An alternative method useful in preventing microbiological attack is the use of a heat sterilization step. For example, a padding device comprising the present composition placed in a polyvinylchloride package can be heated to about 180.F for 30 to 45 minutes. Preferably, this method is employed in an autoclave having a nitrogen atmosphere.

Alternatively, preservatives can be added to the composition in order to prevent microbiological attack and chemical degradation. Examples of suitable preservatives include formaldehyde, methyl- and propylparabens, phenol, phenylmercuric salts, sodium benzoate, sodium propionate, sorbic acid and sorbates (sodium and potassium salts). Additionally, proprietary preservatives such as Busan 11 ml, 85 available from Buckman Laboratory, Dowicide A and Dowicil 75, 200 available from Dow Chemical Company, Proxel GXL and CRL available from ICI Americas Inc., Merbac 35 and Tektamer 38 available from Merk/Calgon Corporation, Thimerosal available from Eli Lilly and Company and Vancide TH available from R.T. Vanderbilt Co., Inc. can be used.

In order to function properly, certain preservatives (e.g. benzoates and sorbates) require a low pH, i.e., acidic, environment. This can be achieved by adding an acid, e.g. citric acid to the composition. Citric and/or other desirable acid is added in an amount sufficient to lower the pH to a range of about pH 4 to about pH 6 and preferably about pH 4.5 to about pH 5.5. In certain instances, such as when silica glass particles are employed, the silica will raise the pH of the system. Therefore, more acid is generally necessary to achieve the desired pH range than for a composition not having silica particles. Preferably from about 0.1 weight percent to about 0.5 weight percent benzoate or sorbate is included in the present compositions.

In another embodiment of the present invention, glycerin is added to the composition. This provides two important advantages. First, it lowers the freezing point of the composition, thereby permitting its use at lower temperatures. Second, it provides a "viscosity bonus effect," described below.

The behavior of some viscosity-increasing agents, such as highly substituted carboxymethylcellulose, in mixed-solvent systems, such as glycerin-water, is similar to its behavior in water alone. However, in mixed systems the viscosity of the solvent affects the viscosity of the solution. For example, if a 60:40 mixture of glycerin and water (which is 10 times as viscous as water alone) is used as the solvent, the resulting solution of well-dispersed carboxymethylcellulose will be ten times as viscous as the comparable solution in water alone. This behavior is commonly referred to as the "viscosity bonus effect."

In accordance with the present invention, a process for producing the present composition is provided. A preferred embodiment of the process includes an initial step of producing two slurries. The first slurry comprises a viscosity-increasing agent and a liquid for which the agent has a low affinity. For example, a first slurry of cellulose-based material and glycerin can be provided. A second slurry, comprising the base liquid, e.g. water, and the spherical particles, is then provided. Acid and preservatives can also be mixed with this second slurry. At the appropriate time, the two slurries are mixed together. Mixing can take place in mechanical mixers such as blenders available from Lightnin and Waring. Alternatively, static mixers such as those available from Chemix and from Lightnin can be used.

As explained hereinbefore, it is advantageous to lower the pH of the compositions to a range of about pH 4 to about pH 6. One reason for this is that the rate of viscosity buildup is slower at lower pH's. This provides a greater amount of time for working with the composition before it fully sets up. For example, when the composition is placed in an enclosure, it is advantageous if the composition maintains a low viscosity for a period of time to allow its insertion into the enclosure. The viscosity buildup rate can also be slowed by using a low temperature liquid and/or by the use of chemical retarders. Alternatively, excess water can initially be employed to lower the viscosity. After the composition is placed in the enclosure, the excess water can be allowed to evaporate until the desired viscosity is attained.

EXAMPLE

A composition was made containing:

| Weight % | Material |
| --- | --- |
| 54.1 | Water |
| 0.9 | Citric Acid |
| 0.3 | Sorbate (Sorbstate TM available from Pfizer Chemicals) |
| 0.3 | Sodium Benzoate |
| 27.6 | Spherical particles (B-37 designation for Glass Bubbles available from 3M) |
| 14.8 | Glycerin |
| 2.0 | Hydroxyethylcellulose (Natrasol TM available from Aqualon) |

The glycerin and hydroxyethylcellulose were mixed together to form a first slurry. The water, citric acid, sorbate, sodium benzoate and microbeads were mixed together to form a second slurry. The two slurries were then mixed together to form the composition. The viscosity of the composition reached its maximum value after approximately 30 minutes. The composition exhibited no separation. The composition had a stable viscosity over a temperature range of −10° C. to about 65° C. Due to the high concentration of water, the material exhibited excellent flame retardancy. This was demonstrated by applying a flame for 40 seconds. After removal of the flame, all burning ceased within 1 second. The pH of the above composition was between about pH 4.5 and pH 5.5.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A flowable, pressure-compensating composition comprising:
   (a) water,
   (b) a material for increasing the viscosity of water, said material having an affinity for the water, and
   (c) substantially spherical particles having a diameter less than about 300 micrometers.

2. The composition as claimed in claim 1 wherein said material comprises gum, cellulose-based materials, soluble oxide polymers or mixtures thereof.

3. The composition as claimed in claim 1 wherein said material is selected from the group consisting of guar, agar, carboxymethylcellulose, hydroxypropylcellulose, hydroxyethylcellulose, polyethyleneoxide and mixtures thereof.

4. The composition as claimed in claim 1 further comprising an outer enclosure for containing said composition.

5. The composition as claimed in claim 4 wherein said outer enclosure is constructed of a material selected from the group consisting of polyvinyl- and polyethylene-based materials.

6. A composition as claimed in claim 4 wherein said outer enclosure is constructed of polyvinylchloride material.

7. The composition as claimed in claim 4 wherein said outer enclosure is substantially non-flammable.

8. The composition as claimed in claim 1 wherein:
   (a) said water is present in an amount from about 20% by weight to about 75% by weight,
   (b) said material is present in an amount from about 0.5% by weight to about 10% by weight, and
   (c) said substantially spherical particles are present in an amount from about 0.1% by weight to about 32% by weight.

9. The composition as claimed in claim 1 wherein:
   (a) said water is present in an amount from about 50% by weight to about 60% by weight,
   (b) said material is present in an amount from about 2% by weight to about 4% by weight,
   (c) said substantially spherical particles are present in an amount from about 20% by weight to about 31% by weight, and
   (d) further comprising an antifreeze in an amount of from about 15% by weight to about 30% by weight.

10. The composition as claimed in claim 1 further comprising a material which provides a viscosity bonus effect.

11. The composition as claimed in claim 1 further comprising glycerin.

12. The composition as claimed in claim 11 wherein said glycerin is present in an amount of from about 15% by weight to about 30% by weight.

13. The composition as claimed in claim 1 further comprising a preservative.

14. The composition as claimed in claim 1 further comprising acid, benzoate, and sorbate.

15. The composition as claimed in claim 1 wherein said composition has been treated with radiation and/or heat in order to kill microorganisms present therein.

16. The composition as claimed in claim 1 wherein said composition has been subjected to x-ray or gamma ray radiation in order to kill microorganisms contained therein.

17. The composition as claimed in claim 1 wherein said composition has been subjected to heat of approximately 180.F for approximately 30 to 45 minutes to kill microorganisms contained therein.

18. A flowable, pressure-compensating composition comprising:
   (a) water in an amount from about 50% by weight to about 60% by weight,
   (b) a material selected from the group consisting of guar, agar, carboxymethylcellulose, hydroxypropylcellulose, hydroxyethylcellulose and polyethyleneoxide in an amount from about 2% by weight to about 4% by weight,
   (c) substantially spherical particles in an amount from about 20% by weight to about 31% by weight,
   (d) glycerin present in an amount from about 15% by weight to about 30% by weight, and
   (e) acid sufficient to provide a pH for the composition in a range from about pH 4 to about pH 6.

19. The composition as claimed in claim 18 further comprising an effective amount of preservatives to prevent microbiological attack on said composition.

20. A process for producing a flowable, pressure-compensating composition comprising:
   (a) selecting a type and amount of viscosity-increasing agent,
   (b) selecting a type and amount of liquid having an affinity for said agent,
   (c) selecting a size, type and amount of substantially spherical particles, and
   (d) mixing the materials until said agent and said particles are distributed throughout said liquid.

21. The process as claimed in claim 20 wherein said agent is selected from the group consisting of agar, guar, carboxymethylcellulose, hydroxypropylcellulose, hydroxyethylcellulose and polyethyleneoxide.

22. The process as claimed in claim 20 wherein said liquid comprises water.

23. The process as claimed in claim 20 wherein:
    (a) the amount of said agent is in a range of from about 0.5 weight percent to about 10 weight percent,
    (b) the amount of said liquid is in a range of from about 20 weight percent to about 75 weight percent, and
    (c) the amount of said particles is in a range from about 0.1 weight percent to about 32 weight percent.

24. The process as claimed in claim 20 wherein said particles have a size of less than 300 micrometers.

25. The process as claimed in claim 20 further comprising the step of adding a material which provides a viscosity bonus effect.

26. The process as claimed in claim 20 further comprising the step of adding glycerin.

27. The process as claimed in claim 20 further comprising the step of adding acid.

28. The process as claimed in claim 20 further comprising the step of adding a preservative.

29. The process as claimed in claim 20 further comprising the step of sealing said pressure-compensating composition within an enclosure.

30. The process as claimed in claim 29 wherein a portion of said enclosure is sealed by heat.

31. The process as claimed in claim 29 wherein said enclosure comprises a polyvinylchloride material.

32. The process as claimed in claim 20 further comprising a step of treating said composition with radiation and/or heat in order to kill microorganisms contained within said composition.

33. The process as claimed in claim 20 further comprising the step of sterilizing said composition by exposing it to x-ray or gamma radiation.

34. The process as claimed in claim 20 further comprising the step of sterilizing said composition by exposing it to heat of at least about 180.F for a period of time of at least about 30 minutes.

35. The process as claimed in claim 20 wherein said substantially spherical particles are less dense than said liquid.

36. The process as claimed in claim 20 wherein said substantially spherical particles have a density greater than the density of said liquid.

37. A process for producing a padding device containing a flowable, pressure-compensating composition, said process comprising the steps of:
    (a) providing a first slurry comprising a viscosity-increasing agent selected from the group consisting of guar, agar, carboxymethylcellulose, hydroxypropylcellulose, hydroxyethylcellulose and polyethyleneoxide in an amount from about 0.5% by weight of the total composition to about 4% by weight together with from about 15% by weight to about 30% by weight glycerin,
    (b) preparing a second slurry comprising from about 50% by weight to about 60% by weight water, from about 20% by weight to about 31% by weight spherical particles and an amount of acid sufficient to provide a composition pH in a range from about pH 4 to about pH 6,
    (c) mixing together said first slurry and second slurry,
    (d) placing said mixture within an enclosure,
    (e) sealing said enclosure, and
    (f) treating said composition in order to prevent microbiological attack.

38. A padding device comprising a flexible enclosure and a flowable, pressure-compensating composition substantially filling said enclosure, said flowable, pressure-compensating composition comprising:
    (a) water in an amount from about 50% by weight to about 60% by weight,
    (b) a material selected from the group consisting of guar, agar, carboxymethylcellulose, hydroxypropylcellulose, hydroxyethylcellulose and polyethyleneoxide in an amount from about 0.5% by weight to about 4.0% by weight,
    (c) substantially spherical particles in an amount from about 20% by weight to about 31% by weight, and
    (d) glycerin present in an amount from about 15% by weight to about 30% by weight.

* * * * *

UNITED STATES PATENT AND TRADEMARK OFFICE
CERTIFICATE OF CORRECTION

PATENT NO. : 5,100,712
DATED : March 31, 1992
INVENTOR(S) : Drew et al.

It is certified that error appears in the above-identified patent and that said Letters Patent is hereby corrected as shown below:

Column 1, line 17, after the word "the" please insert the following:

-- principle of conformation to the shape of an object when --.

Signed and Sealed this

Fourteenth Day of September, 1993

Attest:

BRUCE LEHMAN

Attesting Officer     Commissioner of Patents and Trademarks